US008538652B2

(12) United States Patent
Charpin et al.

(10) Patent No.: US 8,538,652 B2
(45) Date of Patent: Sep. 17, 2013

(54) DEVICE AND METHOD FOR ADJUSTING THE DRIVEABILITY OF AN AUTOMOBILE (75) Inventors: Emmanuel Charpin, Voujeaucourt (FR); Philippe Blaise, Dampierre les Bois (FR); Damien Joucgnoux, Mazieres de Touraine (FR)

(73) Assignees: Peugeot Citroen Automobiles SA, Velizy Villacoublay (FR); Robert Bosch GmbH, Stuttgart (DE)

( * ) Notice: Subject to any disclaimer, the term of this patent is extended or adjusted under 35 U.S.C. 154(b) by 920 days.

(21) Appl. No.: 12/531,284

(22) PCT Filed: Mar. 7, 2008

(86) PCT No.: PCT/EP2008/052786
§ 371 (c)(1),
(2), (4) Date: Dec. 4, 2009

(87) PCT Pub. No.: WO2008/113701
PCT Pub. Date: Sep. 25, 2008

(65) Prior Publication Data
US 2010/0088000 A1  Apr. 8, 2010

(30) Foreign Application Priority Data

Mar. 13, 2007 (FR) .................................. 07 53777

(51) Int. Cl.
*G06F 17/00* (2006.01)
*G06G 7/00* (2006.01)
*B60K 31/00* (2006.01)

(52) U.S. Cl.
USPC ................. 701/70; 701/84; 701/90; 340/439; 180/170

(58) Field of Classification Search
USPC .................. 701/1, 36, 45, 70, 71, 72, 82, 84, 701/90, 91, 93, 94; 340/429, 438–441; 180/170, 178, 179, 197
See application file for complete search history.

(56) References Cited

U.S. PATENT DOCUMENTS

| 4,467,428 | A | * | 8/1984 | Caldwell ......................... 701/94 |
| 5,665,026 | A | * | 9/1997 | Linden .......................... 477/108 |
| 6,052,644 | A | * | 4/2000 | Murakami et al. .............. 701/93 |
| 6,138,071 | A | * | 10/2000 | Sekine et al. ................... 701/93 |

(Continued)

FOREIGN PATENT DOCUMENTS

| DE | 4133060 A1 | 4/1993 |
| DE | 19726214 A1 | 12/1998 |

OTHER PUBLICATIONS

International Search Report of PCT Appl. No. PCT/EP2008/052786 mailed May 9, 2008.

*Primary Examiner* — Thomas Tarcza
*Assistant Examiner* — Edward Pipala
(74) *Attorney, Agent, or Firm* — Nicolas E. Seckel (57) ABSTRACT

The invention relates to a method for adjusting the driveability of at least one wheel of a vehicle, in particular an automobile, that comprises a wheel driving engine (50), engine control means (40), means (62) for supplying information on an acceleration level desired by the vehicle driver, means (22) for providing information on the vehicle acceleration level, and an electronic control unit including computing means (70) for receiving the different information. The computing means (70) are adapted in order to obtain a vehicle acceleration level that corresponds to the acceleration level desired by the driver. The device further includes means for providing information on the vehicle inclination.

17 Claims, 6 Drawing Sheets

(56) References Cited

U.S. PATENT DOCUMENTS 8,275,532 B2  9/2012  Blaise et al.
2003/0216850 A1  11/2003  Trefzer et al.
2006/0089771 A1*  4/2006  Messih et al. .................. 701/45

* cited by examiner

DEVICE AND METHOD FOR ADJUSTING THE DRIVEABILITY OF AN AUTOMOBILE

The present invention concerns a device and method to regulate the traction of automotive vehicles.

Skid control devices are known such as ASR (Acceleration Skid Control), intended to improve the traction performance of an automotive vehicle on all types of terrain.

Wheel control via said device is ensured for different driving conditions of the vehicle, notably for forward or reverse drive on roads or tracks having muddy portions, grass, ruts, quagmires (off road driving) sand, snow or ice, and also for different levels of incline (or slopes) and lean angles of the vehicle related to the configuration of the ground on which the vehicle is driven.

These anti-skid devices can be applied to any two-wheel drive 4×2 or four-wheel drive 4×4 vehicle equipped with a dynamic course control system, generally called ESP and known as Electronic Stability Control, which considerably improves vehicle traction performance. The ESP system ensures different functions such as Continuous Damping Control CDC, an Anti-lock Braking System (ABS), anti-skid regulation ASR and other driving safety functions of a vehicle.

Figure 1:
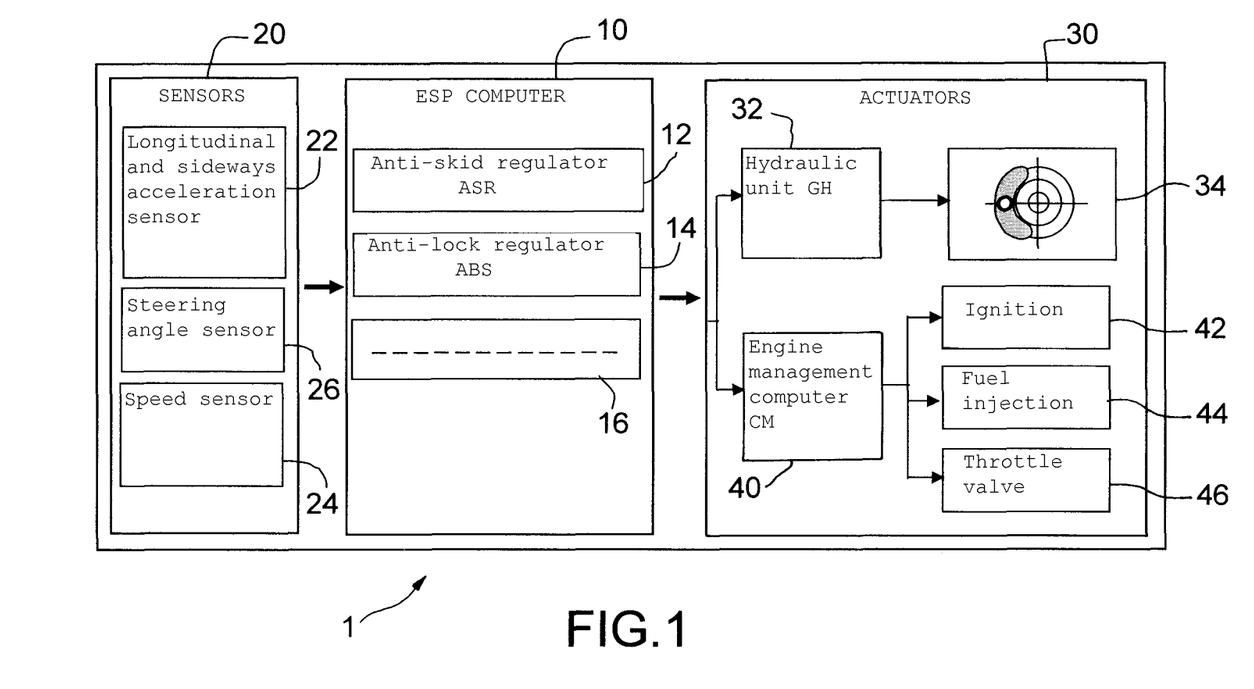
FIG. 1, already described, shows a functional diagram of an ESP system comprising a prior art ASR anti-skid device.

FIG. 1 shows a block diagram of the different functional units in a prior art ESP system.

Figure 2:
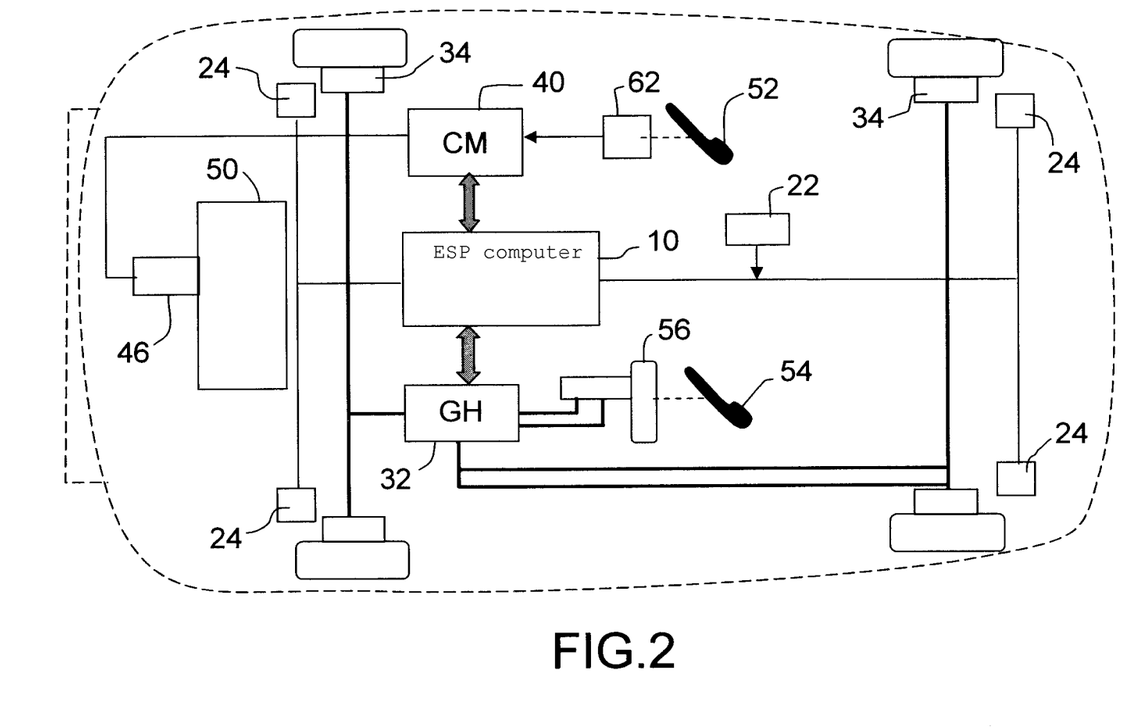
FIG. 2, already described, is a simplified illustration of a vehicle equipped with an anti-skid ASR device as in FIG. 1.

FIG. 2 is a simplified illustration of a vehicle equipped with the ESP system in FIG. 1.

The ESP system in FIG. 1 comprises an ESP computer 10 which may be equipped with several modules regulating vehicle traction, such as an anti-skid regulator ASR 12, an anti-lock braking system ABS 14, but also other modules 16 ensuring different vehicle driving safety functions which are not detailed.

To apply the safety functions, the vehicle in FIG. 2 is equipped with sensors 22, 24, 26 supplying data whose values are related to the vehicle's driving conditions and "living situation" but also to the driver's intentions. Amongst these sensors 20, at least one multi-axis sensor 22 providing longitudinal and sideways acceleration data on the vehicle, at least one wheel speed sensor 24, at least one sensor of parameters related to the driver's intentions such as a steering angle sensor 26 (not shown FIG. 2) providing data on the angle of rotation of the steering-wheel actuated by the driver.

The vehicle comprises actuators 30 acting on the vehicle's propelling or braking elements. A hydraulic unit GH to distribute braking torque on the brakes 34 of the vehicle, an engine management computer CM 40 acting on the angle of engine ignition 42, fuel injection 44 and throttle valve 46.

The vehicle in FIG. 2 equipped with an ESP system 1 comprises a thermal engine 50 driving a vehicle whose speed is controlled by the engine management computer CM 40, an acceleration pedal 52 linked to the engine management computer CM 40, a brake pedal 54 actuating the hydraulic unit GH 32 via a brake amplifier 56 to control the brakes.

The ESP computer comprises means to actuate one or more modules 12, 14, 16 regulating the traction of the vehicle in relation to different parameters of vehicle driving conditions and/or living situation of the vehicle and/or driver's intentions.

Prior art ASR systems are currently fitted to all-terrain vehicles but have defects and deficiencies. To demonstrate these deficiencies, we will consider different driving conditions of an automotive vehicle on-road or off-road, which we call "living situations".

We will use the term "take-off" meaning the changeover from one situation in which the vehicle is at a standing stop (zero speed) to a vehicle start-up situation (non-zero speed).

The vehicle may be driven on two main categories of terrain, low adherence terrain such as sand, gravel, snow or ice; high adherence terrain such as tracks and roads with wet or dry asphalt.

We will consider two main living situations as follows:

a first type of living situation in which the vehicle is driven over terrains with low, average or high adherence, which may be homogeneous or dissymmetrical, with vehicle take-off on a flat surface or take-off on a slope and cant.

In this first type of living situation, the functioning of the prior art regulating systems produces immediate control over the engine and brakes to bring the two or four wheels of the vehicle back to a fixed set point irrespective of adherence, slope or cant of the terrain.

The impact on the vehicle felt by the driver, on ground with low adherence, is lack of traction and a vehicle difficult to control on slopes, and on high adherence roads or ground it is engine shutoff which penalizes take-off speed and hence safety.

a second type of living situation on driving terrains with low or average adherence, homogeneous or dissymmetrical, on which the vehicle is driven over terrain with a slope and cant.

In this second type of living situation, the functioning of prior art regulating systems produces regulation of the two or four wheels around a determined, fixed set point, which may be redefined in the event of detection of deep snow, to optimise traction.

The impact on the vehicle felt by the driver on low-adherence ground is lack of traction and driver frustration faced with failed motion of the vehicle.

To overcome the disadvantages of prior art anti-skid devices, the invention proposes a device to regulate the traction of at least one wheel of a vehicle, notably an automotive vehicle, comprising a wheel drive engine, engine control means, means supplying data on a level of acceleration desired by the vehicle driver, means providing data on the level of acceleration of the vehicle (Av), and an electronic control unit comprising computer means receiving the different data, characterized in that the computer means are configured to obtain a vehicle acceleration level (Av) conforming to the acceleration level desired by the driver.

Advantageously the traction regulating device further comprises means providing data on vehicle lean.

In one embodiment, the level of acceleration desired by the driver is determined by the stroke or displacement of an acceleration control member of the vehicle.

In another embodiment, the acceleration control member is configured so that, when it is actuated by the driver, it is able to move between a rest position corresponding to a zero acceleration level and a maximum position corresponding to a maximum acceleration level of the vehicle.

In another embodiment, the computer means further comprise an acceleration regulator driving the engine control means.

In another embodiment, the electronic control unit is an ESP computer ensuring the safety functions of the vehicle.

The invention also proposes a method to regulate the traction of the wheels of an automotive vehicle for implementation of the traction regulation device according to the invention, the vehicle having an engine to drive at least one wheel of the vehicle, means to control engine speed, means providing data on a level of acceleration desired by the driver, means providing data on a level of vehicle acceleration (Av), and an electronic control unit comprising computer means receiving the different data, characterized in that it consists of controlling the engine by the electronic control unit to obtain a level of acceleration of the vehicle conforming to the level of acceleration desired by the driver.

Advantageously, the method comprises at least the following steps:
- determining a set target acceleration (Ac) from the level of acceleration desired by the driver;
- comparing the level of acceleration of the vehicle (Av) with the set target acceleration (Ac);
- if the acceleration (Av) of the vehicle conforms to the set target acceleration (Ac), the engine control remains unchanged, followed by return to the comparison step between the level of acceleration of the vehicle and the set target acceleration (Ac);
- if the level of acceleration of the vehicle does not conform to the set target acceleration (Ac), engine control is modified, followed by a return to the comparison between the level of acceleration of the vehicle and the set target acceleration.

In one embodiment of the method, the set target acceleration (Ac) is obtained from the desired acceleration of the driver corrected by the level of adherence of the wheels on the ground.

In another embodiment of the method, if the vehicle is being driven on a slope, the level of adherence (T) is corrected by a factor related to the value of the slope derived from means (60) providing data on the lean of the vehicle.

The traction regulating device of the invention uses a novel concept which replaces the conventional anti-skid system. For a 4×2 and 4×4 vehicle, it consists of improving driving traction over roads with high adherence, wet roads, and on low adherence roads or terrain such as previously described.

Improved traction is obtained by this device within physical limits, in particular within available adherence of wheels on the ground, ground height difference, or ground clearance of the vehicle under certain conditions.

The device chiefly consists of a development in the anti-skid algorithms of the prior art with a more dynamic approach to traction.

The device is potentially applicable to any 4×2 and 4×4 vehicle equipped with an ESP system, and allows the traction performance of vehicles to be significantly increased. It also provides precious assistance both to novices and to experienced drivers.

The device of the invention allows traction to be optimized i.e. to obtain the best functioning point of the tyre in relation to available adherence, and to produce the best possible acceleration conforming to the driver's intention.

The invention will be better understood with the examples of embodiment of a regulating device according to the invention, with reference to the appended drawings in which.

The device according to the invention lies within the scope of an anti-skid device for deteriorated roadway as described in a first patent application in France no 06 07392.

The software of the skid control module ASR in this anti-skid device is configured to use:
- control laws specific to the vehicle's actuators for the management of vehicle living situations in three phases: Phase 0, Phase 1 and Phase 3, a Phase 2 being a transition phase between Phase 1 and Phase 3,
- control laws specific to management of slip rate taking the driver's intentions into account.

Figure 3:
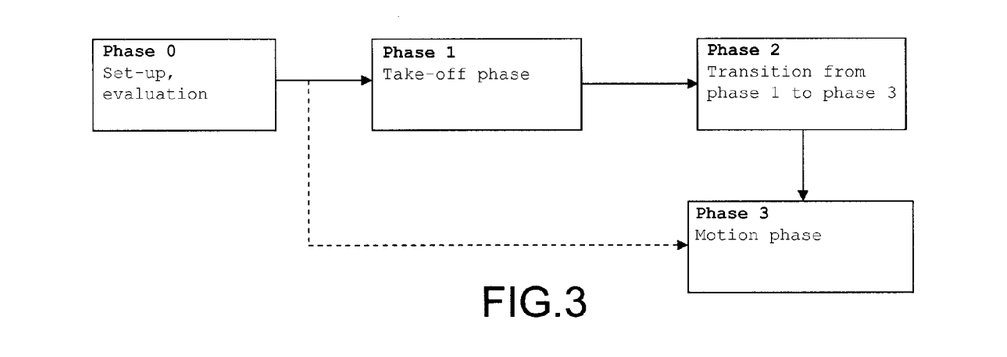
FIG. 3 is a flow chart of Phases 0, 1, 2, 3 of the method used by a prior art anti-skid module subject of patent application in France no 06 07392.

FIG. 3 is a flow chart of Phases 0, 1, 2 3 of the method applied by a prior art anti-skid module.

These phases may be briefly described as follows:
- Phase 0: analysis and evaluation of the conditions of surface adherence, slope, cant, and driver intentions;
- Phase 1 or "takeoff" phase: characterized by the choice of a wheel which is braked to obtain traction, making maximum use of available adherence and transferring torque to the ground;
- Phase 2 is a transition phase between phase 1 and phase 3; and
- Phase 3 is a phase of vehicle motion.

Figure 4:
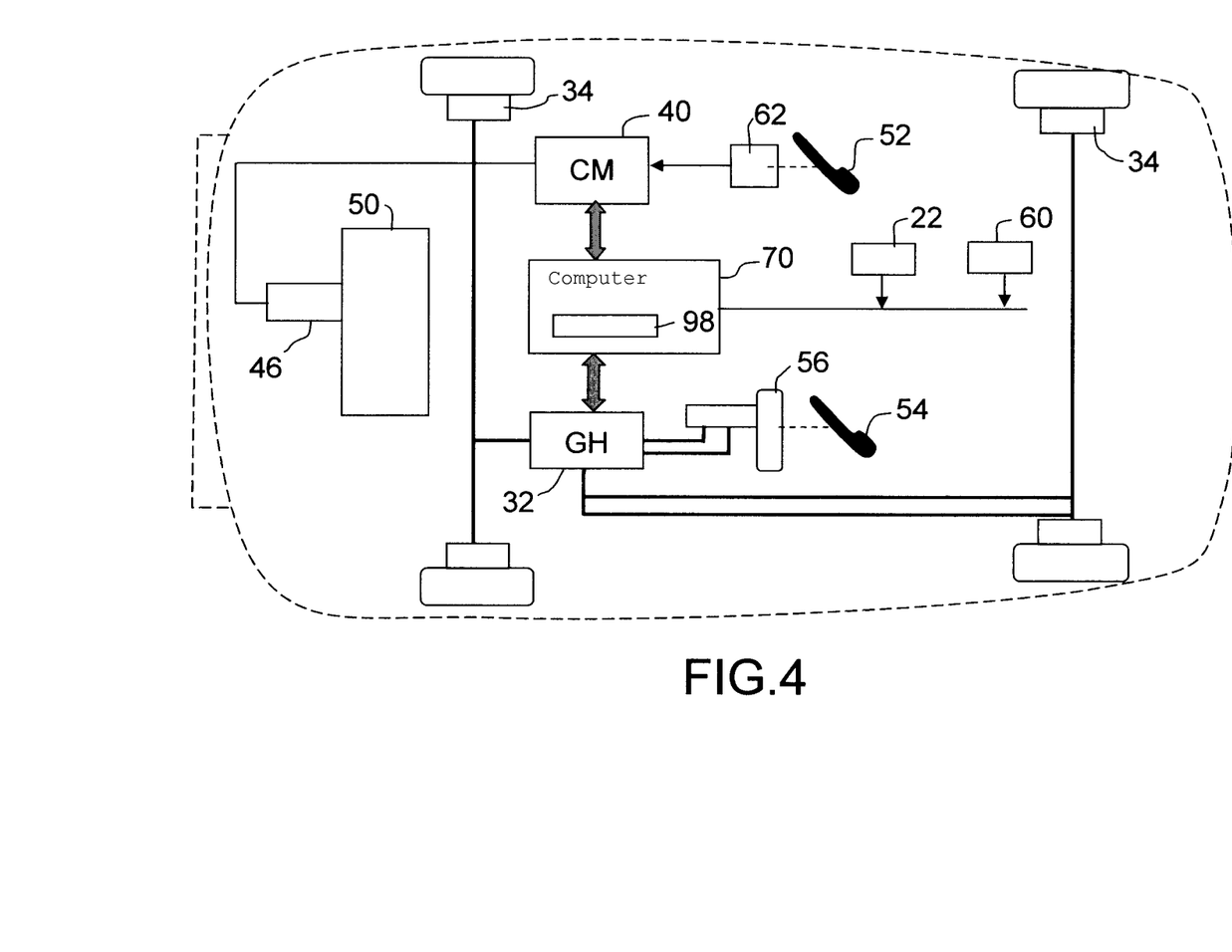
FIG. 4 shows the vehicle of FIG. 1 equipped with a traction regulating device according to the invention.

FIG. 4 shows the vehicle of FIG. 1 equipped with a traction regulation device according to the invention.

Depending upon the acceleration of the vehicle computed during a determined fixed time, it is possible to change over to Phase 3 directly (see solid line).

The vehicle in FIG. 4 comprises a thermal drive engine 50 whose torque or throttle is controlled by the computer of the engine control CM 40.

To ensure the operating functions of the device and method to implement the device of the invention, the vehicle comprises means 62 providing data on the stroke of the acceleration pedal 52 actuated by the driver, means providing data on the level of acceleration of the vehicle 22, and engine control means 70.

It may further comprise means 60 providing data one vehicle tilt or lean.

These different means may be sensors measuring the different data, or engine control software means estimating said data from different algorithms such as, for vehicle acceleration, an algorithm based on a difference in wheel speed in relation to time.

In this embodiment in FIG. 4, the acceleration desired by the driver is determined by the stroke of the acceleration pedal 52 of the vehicle.

According to one chief characteristic of the invention, the engine control means 70 are configured to obtain a level of acceleration of the vehicle conforming to the level of acceleration desired by the driver. For this purpose, the engine control means 70 drive the engine computer 40 acting on engine ignition 42, fuel injection 44 and the throttle valve 46.

Generally the engine control means 70 are implemented by a computer comprising software means applying the operating functions of the traction regulation device. This computer may be an ESP computer ensuring vehicle safety operating functions such as illustrated FIGS. 1 and 2.

The acceleration pedal is configured so that, when actuated by the driver, it can move between a rest position corresponding to a zero acceleration level and a maximum position corresponding to a maximum acceleration level of the vehicle. The sensor sensing movement of the pedal 62 provides the engine control CM 40 and computer 70 with data on the movement of the acceleration pedal and hence on the level of acceleration desired by the driver.

The computer 70 further comprises means to determine grip of the wheels on the ground.

A description is given below, in the form of a method, of the novel operating functions of the traction regulation device of the invention during the motion phase of the vehicle or phase 3.

Figure 5:
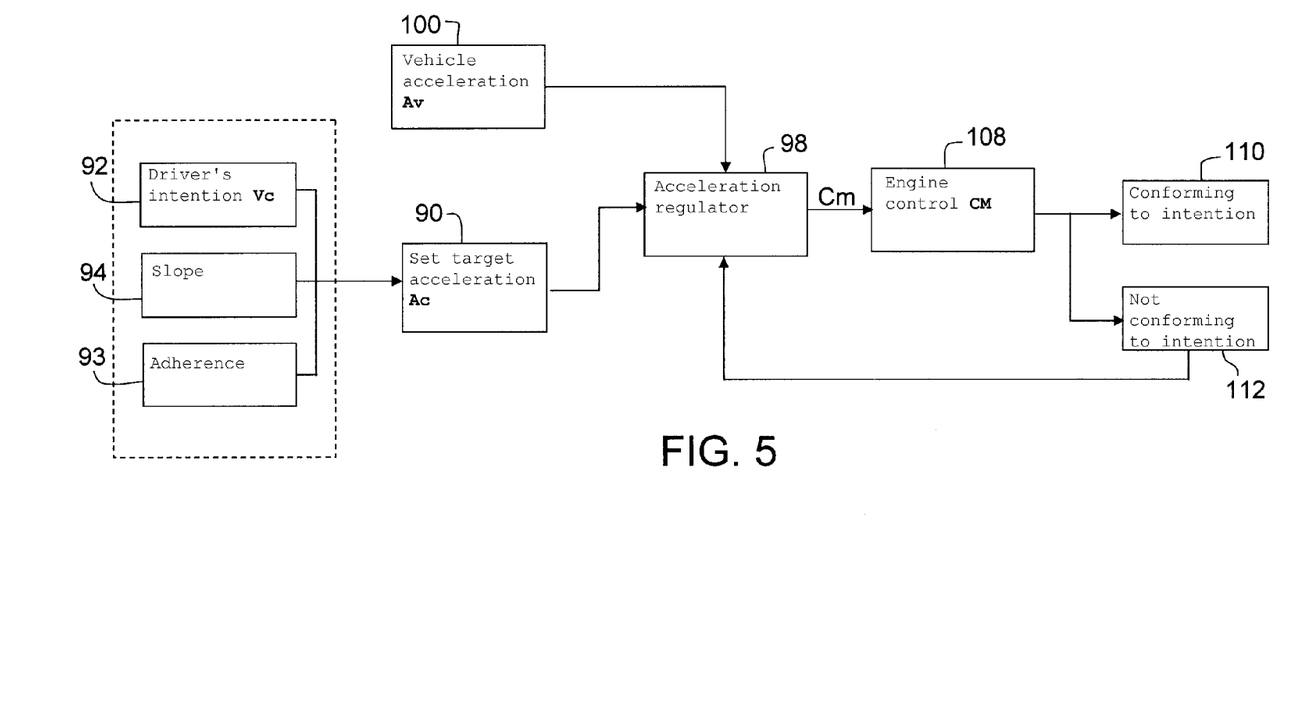
FIG. 5 is a synopsis of a method to regulate traction according to the invention.

FIG. 5 gives a synopsis of a method to regulate traction according to the invention, during this Phase 3 or motion phase of the vehicle.

The method comprises at least the following steps.

During a first step, the method of the invention consists of determining a set target acceleration Ac 90 on the basis of the desire 92 of the driver corrected by a factor related to adherence 93 and slope 94.

The driver's desired acceleration of the vehicle is substantiated by greater or lesser pressure on the acceleration pedal 52.

The pedal sensor 62 provides the computer 70 with data on the position of the acceleration pedal.

The desired acceleration Va is not directly transmitted by the computer 70 to the engine control CM 40 but is previously corrected by factors external to the vehicle, which the driver cannot precisely determine or does not take into account. For example, it is of no use to transmit strong acceleration under the set target acceleration Ac if ground adherence is low which would cause substantial wheel spin on the ground and lack of vehicle motion.

Similarly, if the vehicle is being driven on a slope the slip rate T (adherence level) is corrected by a factor related to the value of this slope.

Figure 6A:
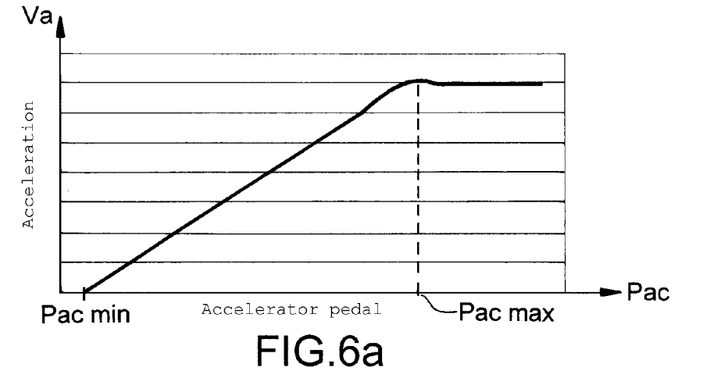
FIG. 6a shows the acceleration desired by the driver in relation to the stroke of the accelerator pedal.

FIG. 6a shows developments in desired acceleration Va by the driver, in relation to the stroke Pac of the accelerator pedal.

The curve representing this function shows a linear part of determined slope, delimited by a lower limit Pacmin and an upper limit Pacmax.

The tracing of this curve ends in a plateau for a pedal stroke value above the upper limit Pacmax (maximum depression of the pedal) a plateau for which acceleration remains constant.

Figure 6B:
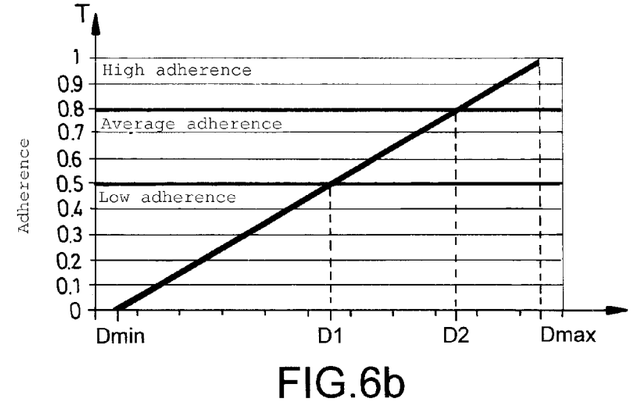
FIG. 6b shows the limitation of the value of the acceleration pedal stroke in relation to different rates of ground adherence.

FIG. 6b shows the limitation of the stroke value of the acceleration pedal in relation to different rates of ground adherence T.

The slip rate T lies between 0 for zero adherence and 1 for maximum adherence.

For a determined adherence (low, average, high) the stroke value of the accelerator pedal lies between the minimum value Pacmin and the maximum value Pac max and the data sent by the ESP to the engine control, after processing, cannot exceed a set value D1 which varies between Dmin and Dmax.

By low adherence, in the described example, is meant a rate T of between 0 and 0.5, for which the stroke value of the accelerator pedal lies between Dmin and D1 (D1 greater than Dmin).

By average adherence, in the described example, is meant a rate T of between 0.5 and 0.8 for which the stroke value of the accelerator pedal lies between D1 and D2 (D2 greater than D1).

By high adherence, in the described example, is meant a rate T of between 0.8 and 1 and for which the stroke value of the accelerator pedal lies between D1 and D2 (D2 greater than D1).

During a second step the method of the invention, via an acceleration regulator 98 of the computer 70, consists of comparing the acceleration of the vehicle 100 Av provided by the acceleration sensor 22 with the set target acceleration Ac (driver's intention corrected) so as then to provide an acceleration command Cm to the engine control CM 40 to obtain vehicle acceleration Av close to the target acceleration Ac 90.

During a third step, the method of the invention consists of comparing the acceleration of the vehicle with the set target acceleration to determine:

whether the acceleration of the vehicle Av 100 conforms 110 to the set target acceleration Ac 90, in which case the engine control parameters are maintained;

whether the acceleration of the vehicle Av does not conform 112 to the set target acceleration Ac, in which case the acceleration regulator 98 modifies the acceleration command Cm sent to the engine control CM 40 to obtain another acceleration Av of the vehicle and to draw near to the set target acceleration Ac 90.

Figure 7A:
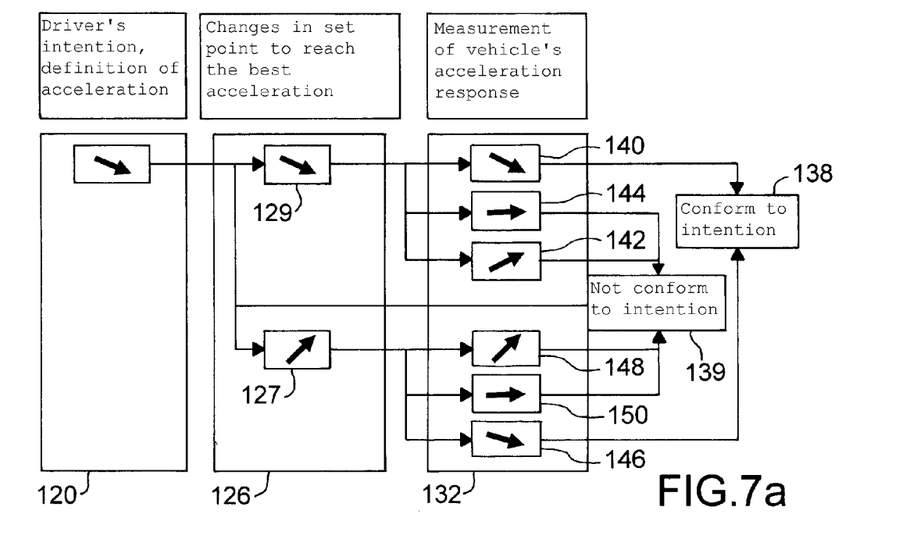
FIGS. 7a, 7b and 7c show synopses according to three configurations of vehicle traction regulation according to the invention.
Figure 7B:
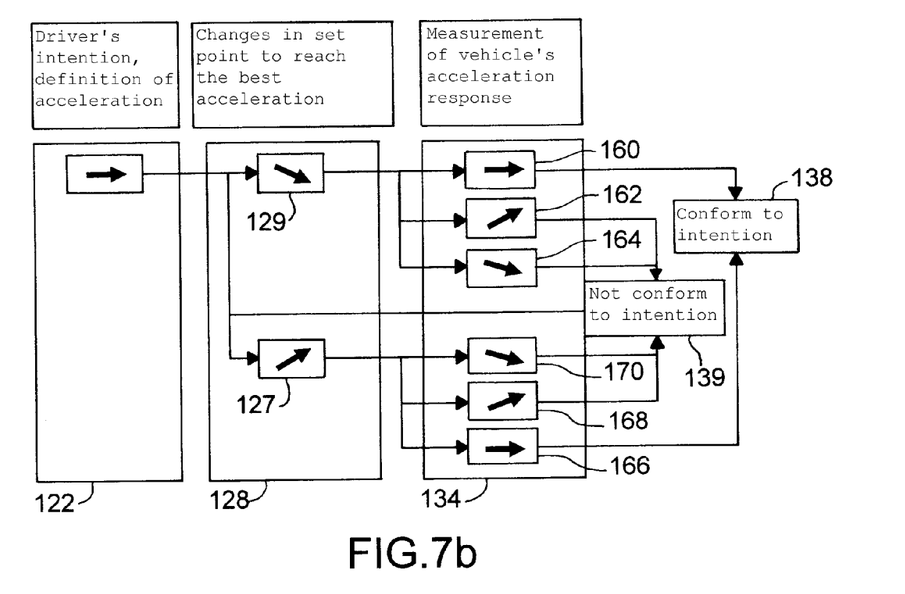
Figure 7C:
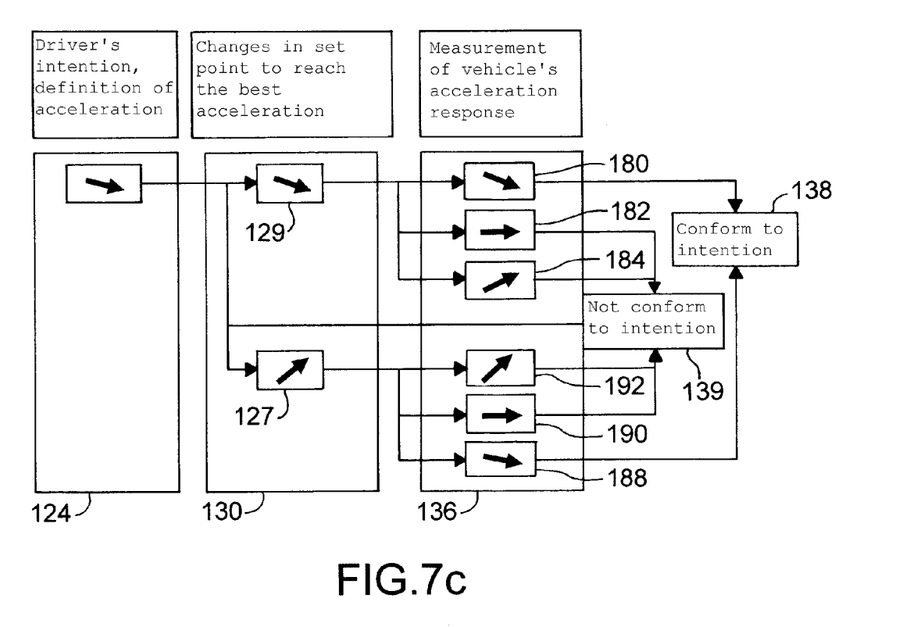

FIGS. 7a, 7b and 7c show synopses of three configurations of vehicle traction regulation according to the invention.

FIG. 7a shows a first configuration resulting from the driver's intention to accelerate.

FIG. 7b shows a second configuration resulting from the driver's intention to maintain acceleration.

FIG. 7c shows a third configuration resulting from the driver's intention to decelerate.

These three configurations comprise the following steps:
During a first step:
defining the set target acceleration such as previously described, in relation to the driver's intention corrected by adherence and vehicle lean;
driver's intention to accelerate 120;
driver's intention to maintain acceleration 122;
driver's intention to decelerate 124.
During a second following step 126, 128, 130:
providing, by the acceleration regulator 98, of a set acceleration to the engine control CM (controlling engine parameters) to reach the best acceleration conforming to the driver's intention:
increasing set acceleration 127;
decreasing set acceleration 129.
During following step three 132, 134, 136:
measuring the response of vehicle acceleration
During this third step:
either measurement of vehicle acceleration response conforms 138 to the driver's intention and the engine control parameters are maintained;
or measurement of the vehicle's acceleration response does not conform to the driver's intention 139, in which case return to step two 126, 128, 130 to change the set acceleration.

The method is described in more detail below.

When the driver intends to accelerate 120 (see FIG. 7a):
decreasing set acceleration 129 may lead either to an increase 140 conforming to the driver's intention, or to a decrease 142 or maintained 144 acceleration of the vehicle not conforming to the driver's intention (definition of acceleration);
increasing set acceleration 127 may lead either to an increase 146 conforming to the driver's intention or to a decrease 148 or maintained 150 acceleration of the vehicle not conforming to the driver's intention.
If the driver's intention is to maintain acceleration 122:
decreasing set acceleration 129 may lead either to maintained acceleration 160 of the vehicle conforming to the driver's intention, or to an increase 162 or decrease 164 in acceleration of the vehicle not conforming to the driver's intention;

decreasing set acceleration 127 may lead either to maintained acceleration 166 of the vehicle conforming to the driver's intention, or to an increase 168 or decrease 170 in vehicle acceleration not conforming to the driver's intention.

If the driver intends to decelerate 124:

decreasing set acceleration 129 may lead either to a decrease 180 in acceleration of the vehicle conforming to the driver' intention, or to maintained 182 or increased 184 acceleration of the vehicle not conforming to the driver's intention;

increasing set acceleration 127 may lead either to a decrease 188 in acceleration conforming to the driver's intention, or to maintained 190 or increased 192 acceleration of the vehicle not conforming to the driver's intention.

Changes in the set acceleration lead to changes in the engine speed parameters by the engine control computer.

The economic and technical advantages of the invention are numerous, notably on driving terrains with low or strong adherence, and either for vehicle take-off on a flat surface with low, average and high adherence homogeneous or dissymmetrical, or for take-off on a slope or cant with low, average and high adherence homogeneous or dissymmetrical.

On these types of terrain, the acceleration regulator is configured to carry out evaluation of adherence and slope, taking the driver's intention into account to calculate the set acceleration.

The impact brought by the device of the invention on client performance is notable on terrains with low adherence on which the vehicle can still be steered despite search for traction. On high adherence terrains the driver no longer undergoes engine shutoffs, providing improved safety for rapid start-ups.

If the vehicle is driven on slopes and cants with low average or high adherence, homogeneous or dissymmetrical, the acceleration regulator is configured to search for a tyre functioning point to provide the best possible acceleration in relation to adherence, slope and cant and to the driver's intention.

The impact on client performance on terrains with low adherence translates as substantial traction and steerability. The driver no longer feels frustrated. Greater safety on start-up and optimised adherence are also provided.

The device and method of the invention therefore allow the best functioning point of the tyre to be identified in relation to available adherence, and allow the best possible acceleration to be produced conforming to the driver's request.

The invention claimed is:

1. Device to regulate the traction of at least one wheel of a vehicle, notably an automotive vehicle, comprising:
   an engine driving the wheel,
   engine control means,
   means providing data on a level of acceleration desired by the vehicle driver,
   means providing data on a level of acceleration (Av) of the vehicle, and
   an electronic control unit comprising computer means receiving the data on the level of acceleration desired by the vehicle driver and on the level of acceleration (Av) of the vehicle, the computer means being configured to drive the engine control means so as to obtain a level of acceleration of the vehicle (Av) conforming to a set target acceleration (Ac) corresponding to the level of acceleration desired by the driver.

2. Device to regulate acceleration and traction according to claim 1, wherein the level of acceleration desired by the driver is determined by the stroke or displacement of an acceleration control member of the vehicle.

3. Traction regulation device according to claim 2, wherein the acceleration control member is configured so that, when actuated by the driver, it can move between a rest position corresponding to a zero acceleration level and a maximum position corresponding to a maximum acceleration level of the vehicle.

4. Traction regulation device according to claim 3, wherein the electronic control unit is an ESP computer ensuring safety functions of the vehicle.

5. Traction regulation device according to claim 3, wherein the computer means further comprise an acceleration regulator driving the engine control means.

6. Traction regulation device according to claim 5, wherein the electronic control unit is an ESP computer ensuring safety functions of the vehicle.

7. Traction regulation device according to claim 2, wherein the computer means further comprise an acceleration regulator driving the engine control means.

8. Traction regulation device according to claim 7, wherein the electronic control unit is an ESP computer ensuring safety functions of the vehicle.

9. Traction regulation device according to claim 2, wherein the electronic control unit is an ESP computer ensuring safety functions of the vehicle.

10. Traction regulation device according to claim 1, wherein the computer means further comprise an acceleration regulator driving the engine control means.

11. Traction regulation device according to claim 10, wherein the electronic control unit is an ESP computer ensuring safety functions of the vehicle.

12. Traction regulation device according to claim 1, wherein the electronic control unit is an ESP computer ensuring safety functions of the vehicle.

13. Traction regulation device according to claim 1, further comprising means providing data on the level of adherence of the wheels on the ground, wherein the target acceleration (Ac) is obtained from the desired acceleration of the driver corrected by the level of adherence of the wheels on the ground.

14. Traction regulation device according to claim 13, further comprising means providing data on lean of the vehicle, wherein, when the vehicle is being driven over sloped terrain, the level of adherence (T) is corrected by a factor related to the value of the slope derived from the means providing data on lean of the vehicle.

15. Method to regulate the traction of the wheels of an automotive vehicle, the vehicle having an engine driving at least one wheel of the vehicle, means to control engine speed, means providing data on a level of acceleration desired by the driver of the vehicle, means providing data on a level of acceleration (Av) of the vehicle, and an electronic control unit comprising computer means receiving the different data, the method consisting of controlling the engine by the electronic control unit to obtain a level of acceleration of the vehicle conforming to the level of acceleration desired by the driver, wherein the method comprises at least the following steps:
    determining a set target acceleration (Ac) from the level of acceleration desired by the driver;
    comparing the level of acceleration of the vehicle (Av) with the set target acceleration (Ac);
    if the acceleration of the vehicle (Av) conforms to the set target acceleration (Ac) the engine control remains unchanged, then return to the comparison step between the level of acceleration of the vehicle and the set target acceleration (Ac);

if the level of acceleration of the vehicle does not conform to the set target acceleration (Ac) modification of engine control then return to the comparison step between the level of acceleration of the vehicle and the set target acceleration.

16. Method to regulate traction according to claim 15, wherein the set target acceleration (Ac) is obtained from the desired acceleration of the driver corrected by the level of adherence of the wheels on the ground.

17. Method to regulate traction according to claim 16, wherein, when the vehicle is being driven over sloped terrain, the level of adherence (T) is corrected by a factor related to the value of the slope derived from means providing data on lean of the vehicle.

* * * * *

UNITED STATES PATENT AND TRADEMARK OFFICE
CERTIFICATE OF CORRECTION

PATENT NO. : 8,538,652 B2 Page 1 of 1
APPLICATION NO. : 12/531284
DATED : September 17, 2013
INVENTOR(S) : Charpin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this
Fifteenth Day of September, 2015

Michelle K. Lee
*Director of the United States Patent and Trademark Office*